(12) United States Patent
Lau et al.

(10) Patent No.: US 12,530,299 B2
(45) Date of Patent: Jan. 20, 2026

(54) SYSTEM AND METHOD FOR PRIMARY STORAGE WRITE TRAFFIC MANAGEMENT

(71) Applicant: EFINIX, INC., Cupertino, CA (US)

(72) Inventors: Karn Ming Lau, Bayan Lepas (MY); Joo Jie Ho, Bayan Lepas (MY); Ching Lun Yan, Bayan Lepas (MY)

(73) Assignee: EFINIX, INC., Cupertino, CA (US)

( * ) Notice: Subject to any disclaimer, the term of this patent is extended or adjusted under 35 U.S.C. 154(b) by 63 days.

(21) Appl. No.: 18/612,728

(22) Filed: Mar. 21, 2024

(65) Prior Publication Data

US 2025/0298745 A1    Sep. 25, 2025

(51) Int. Cl.
*G06F 12/0817* (2016.01)
*G06F 12/0808* (2016.01)
*G06F 13/16* (2006.01)

(52) U.S. Cl.
CPC ...... *G06F 12/0828* (2013.01); *G06F 12/0808* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 10,223,280 B2 | 3/2019 | Kalyanasundharam et al. | |
| 2016/0378701 A1* | 12/2016 | Niell | G06F 13/28 710/308 |
| 2017/0220499 A1* | 8/2017 | Gray | G06F 13/36 |
| 2019/0286567 A1* | 9/2019 | Chaudhuri | G06F 12/0804 |
| 2020/0371927 A1* | 11/2020 | Chachad | G06F 12/1441 |

* cited by examiner

*Primary Examiner* — Charles J Choi
(74) *Attorney, Agent, or Firm* — HSML P.C.

(57) ABSTRACT

The present invention relates to a system (101) and method for primary storage write traffic management, which can improve the overall system on chip (SoC) data traffic efficiency between the processor (103), direct memory access (DMA) channel (111) and the main memory (113), by minimizing the latency to write the data to the main memory (113). This is done by reducing the number of writes from the processor (103) to the main memory (113) without sacrificing data consistency between the processor (103) and the DMA channel (111).

5 Claims, 4 Drawing Sheets

303

SYSTEM AND METHOD FOR PRIMARY STORAGE WRITE TRAFFIC MANAGEMENT

1. TECHNICAL FIELD OF THE INVENTION

The present invention relates to a system and method for primary storage write traffic management, which can improve the overall system on chip (SoC) data traffic efficiency between the processor, direct memory access (DMA) channel and the main memory, by minimizing the latency to write the data to the main memory. This is done by reducing the number of writes from the processor to the main memory without sacrificing data consistency between the processor and the DMA channel.

2. BACKGROUND OF THE INVENTION

In designing a system on a chip (SoC), the processor/central processing unit (CPU) is not only the component that has access to retrieve or modify the content of a primary storage/main memory. In modern SoC architecture, there are masters like direct memory access (DMA) modules and CPU with multiple cores that require the main memory to store their data for various purposes. However, the latency to access the main memory would be a blocking to each master as they require to halt the operation until the data is ready. Therefore, many masters having operation which is sensitive to latency, especially the CPU, are equipped with local memories that buffer the content from or to the main memory so that they can have quicker access to the data compared to retrieving it from the main memory. In solving this, some SoC has different levels of caches hierarchy like L1, L2 and L3 to accommodate the data locality but this solution raises another concern on size of area and data coherency.

The size of the semiconductor die is one of the main factors driving the cost to make the integrated circuit (IC) and most manufacturers tend to have smaller size of die so that they can have lower manufacturing cost. Static random-access memory (SRAM) blocks that are being used in caches is one the key factors to affect the size of the die. L1 cache, which is the fastest memory and nearest to the CPU, typically has a size of a few kilobytes (KB) per CPU core. L2 cache is slower than L1 cache but has bigger size, typically around a few hundred of KB per CPU core. L3 cache is the slowest memory and having the biggest size, typically a few megabytes (MB) and it is typically shared among the CPU cores. If the size of caches keeps increasing to get the SoC more efficient in performing its tasks, it will eventually lead to the increasing size of the die.

When there are multiple masters and multi-level hierarchy of caches within the SoC, another problem is how to maintain the data coherency between the masters. The data coherency issue happens when one master updates the content of data at a certain address and the data update happens only at the data cache and does not propagate the data updates to the main memory. The other masters are not acknowledged about the data changes, and they could still use the old data for further processing. This conflict usually happens between CPU and DMA channels.

KALYANASUNDHARAM VYDHYANATHAN, U.S. Pat. No. 10,223,280B2, disclosed a system including a gasket communicatively coupled between a unified north-bridge (UNB) having a cache coherent interconnect (CCI) interface and a processor having an Advanced extensible Interface (AXI) coherency extension (ACE), but it does not have a snooper logic used to manage between the plurality of masters (CPUs, DMA) with the main memory.

Hence, it would be advantageous to alleviate the shortcomings by having a system and method for primary storage write traffic management, which can improve the overall SoC data traffic efficiency between the processor, DMA channel and main memory by minimizing the latency to write the data to the main memory.

3. SUMMARY OF THE INVENTION

Accordingly, it is the primary aim of the present invention to provide a system and method for primary storage write traffic management which improves the overall system's data traffic efficiency between the processor, direct memory access (DMA) channel and the main memory by minimizing the latency to write the data to memory.

It is yet another objective of the present invention to provide a system and method for primary storage write traffic management which reduces the number of writes from the processor to the main memory without sacrificing data consistency between the processor and the DMA.

It is yet another objective of the present invention to provide a system and method for primary storage write traffic management which minimizes the usage of block random-access memory (RAM) being used in a SoC as it does not require multiple layers of CPU caches, but is still able to get moderately good traffic efficiency.

Additional objects of the invention will become apparent with an understanding of the following detailed description of the invention or upon employment of the invention in actual practice.

According to the preferred embodiment of the present invention the following is provided:

a System Comprising:
- at least one processor; each processor connected to at least one level-1 cache;
- at least one external memory interface;
- at least one direct memory access (DMA);
- said level-1 cache in communication with at least one coherency manager configured to ensure consistency of data shared by said processor;
- characterized in that
- said external memory interface comprises of a write buffer unit connected between said coherency manager and at least one primary data storage; wherein said write buffer unit is configured to minimize write request to said primary data storage.

In Another Embodiment of the Invention there is Provided:

A method for primary storage write traffic management, comprising the steps of:
(i) writing data to at least one level-1 data cache by its corresponding processor;
(ii) storing propagated said data in at least one write buffer storage;
(iii) invalidating other processor's level-1 data cache.

4. BRIEF DESCRIPTION OF THE DRAWINGS

Other aspect of the present invention and their advantages will be discerned after studying the Detailed Description in conjunction with the accompanying drawings in which.

5. DETAILED DESCRIPTION OF THE DRAWINGS

In the following detailed description, numerous specific details are set forth in order to provide a thorough understanding of the invention. However, it will be understood by the person having ordinary skill in the art that the invention may be practised without these specific details. In other instances, well known methods, procedures and/or components have not been described in detail so as not to obscure the invention.

The invention will be more clearly understood from the following description of the embodiments thereof, given by way of example only with reference to the accompanying drawings, which are not drawn to scale.

Figure 1:
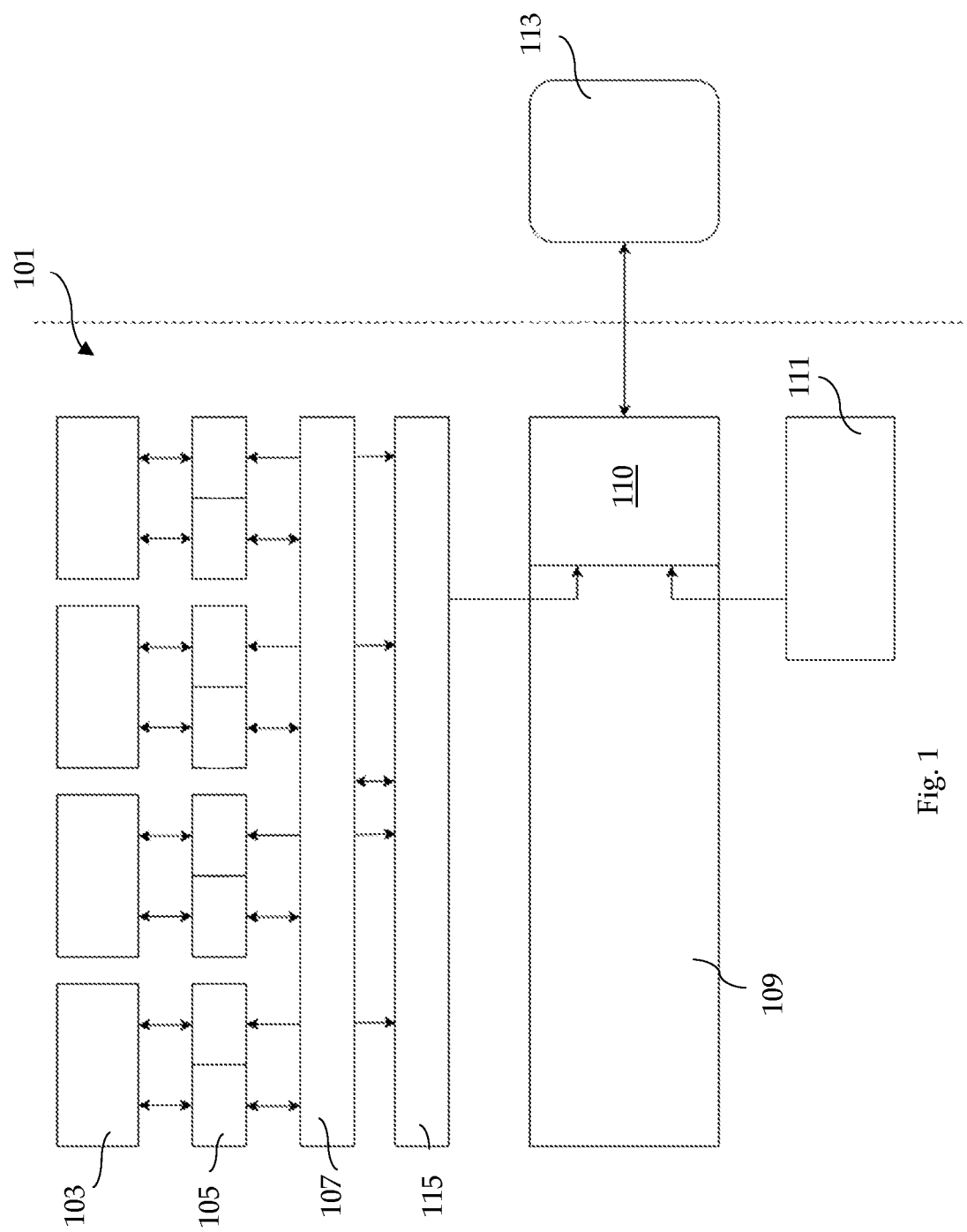
FIG. 1 is a block diagram showing the system of the present invention.

The present invention is a system (101 comprising at least one processor/CPU (103 wherein each processor 103 is connected to at least one level-1 cache 105. The level-1 cache (105 is in communication with at least one coherency manager 107 configured to ensure consistency of data shared by said processor 103. The level-1 cache 105 comprises of data cache, instructions cache or combination thereof. Generally, both data cache and instructions cache are used, but it is also possible for only the data cache to be used. The data cache is connected to the coherency manager 107 to make sure the data shared among the CPUs is consistent. An example of configuration of the system 101 is shown in FIG. 1, where the system may be a system on a chip (SoC) whereby four CPUs are used, with one data cache and one instruction cache for each CPU.

Figure 2:
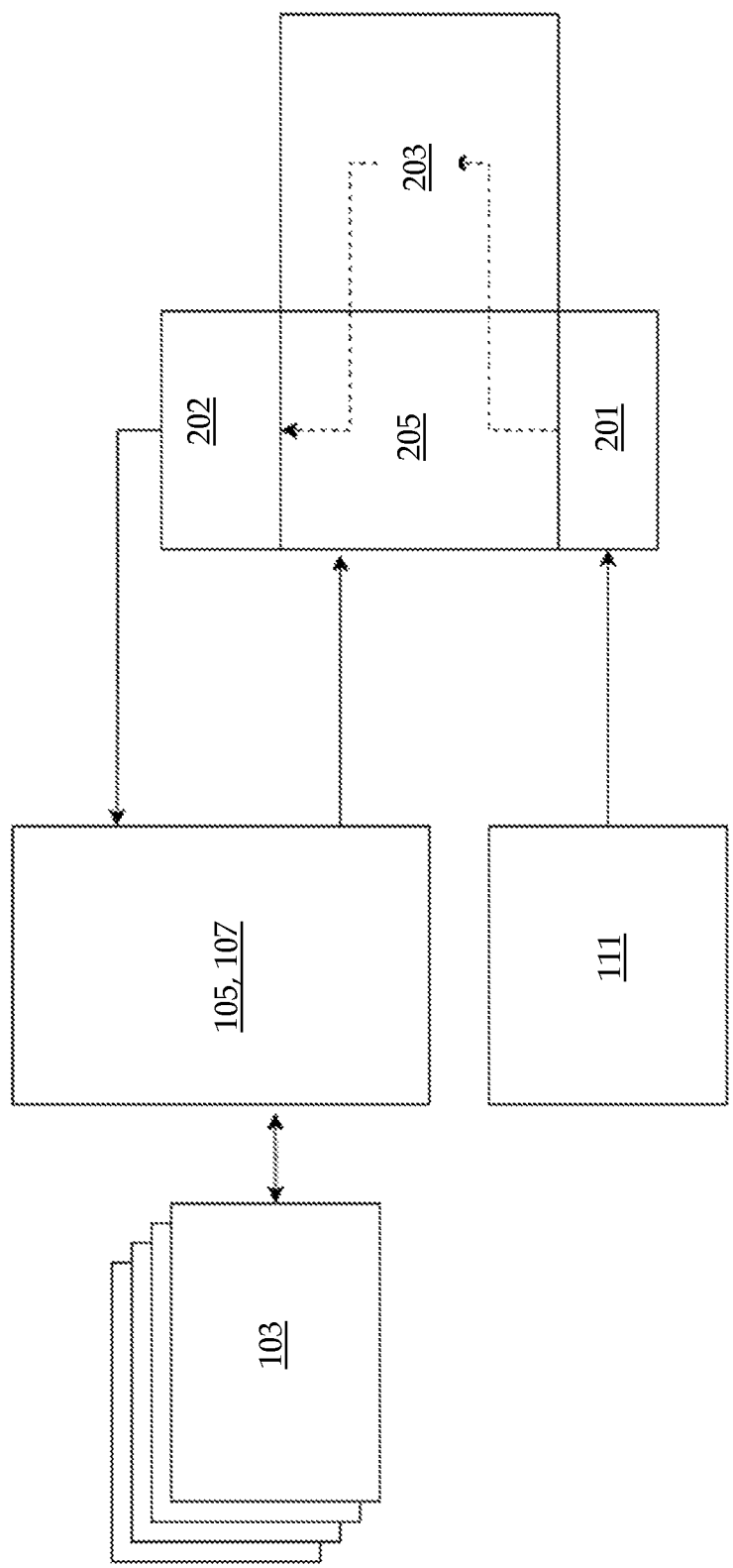
FIG. 2 is a block diagram showing the system of the present invention with details of the components of the write buffer unit.

As shown in FIG. 2, the system 101 further comprises of at least one external memory interface 109 and at least one direct memory access 111. The external memory interface 109, is preferably using Advanced extensible Interface (AXI) communication bus protocol and comprises of a write buffer unit 110 connected between said coherency manager 107 and at least one primary data storage 113; wherein said write buffer unit 110 is configured to minimize write request to said primary data storage 113 by providing buffer storage to keep data within the external memory interface 109 and consolidating multiple data with adjacent address into a single transfer. The coherency manager 107 will communicate with write buffer unit 110 through at least one CPU local bus 115. The write buffer unit 110 is also connected between said DMA 111 and said primary data storage 113. The write buffer unit 110 is generally embedded in said external memory interface 109. The write buffer unit 110 comprises of at least one write buffer storage 205, at least one traffic scheduler 203, at least one read snooper logic 201 and at least one write snooper logic 202. The traffic scheduler 203 is configured to manage the read/write requests and data flow with the main memory. The traffic scheduler 203 also helps to flush data from said write buffer storage 205 to said primary data storage 113 when it requires to make room for new memory block written by the CPU. It may also need to flush portion of memory block when the DMA channel tries to access the same memory block written by the CPU or user explicitly ask for the flush. The write buffer is responsible to store the write data temporarily to said write buffer storage 205 at said external memory interface 109. The read snooper logic 201 and write snooper logic 202 is configured to monitor data traffic from said direct memory access 111 and keep the data consistent with the CPU caches. The read snooper logic 201 and write snooper logic 202 will react accordingly whenever the AXI DMA channel tries to get or modify the write data from CPUs.

A write buffer is a hardware storage that holds the address, data and data control associated with processor/CPU writes to the main memory. It can improve system performance by shortening the latency for CPU to execute the store instruction as CPU does not require to wait for the stores to be completed to main memory. The write buffer itself will automatically flush the holding data to the main memory when the write buffer fills up. The system earns performance benefit if the write buffer is allocated with reasonable size. One example of a reasonable size is 4 KB, but other suitable size is also acceptable. Other than that, write buffer can merge multiple write data into single burst transaction provided the write data is adjacent bytes. This allows the write buffer to issue less write request to main memory and thus boost the overall performance.

The CPUs are configured to execute programs and main drivers to transact data over to the primary data storage 113. The issue of multiple masters (i.e. DMA, CPUs) can be fixed using at least one snooper logic 201,202 that is embedded in the external memory interface/interconnect to monitor the status of data across the plurality of masters and react according to protocol that is being used if the snooper logic figures out some changes in the main memory made by the master. There are basically two types of bus-snooping protocols: write invalidate and write broadcast. Each type has its own advantages and thus implementation should be focused on criticality of bandwidth or latency. The snooper logic 201, 202 of the present invention cross check any requests from said direct memory access 111 and ensures that said direct memory access 111 does not overwrite the content of said write buffer storage 205 without the processor's 103 consent. The primary data storage 113 is preferably the main memory.

The direct memory access 111 is preferably using Advanced extensible Interface 4 (AXI4) communication bus protocol. The system 101 is preferably RISC-V system on a chip (SOC).

Figure 3:
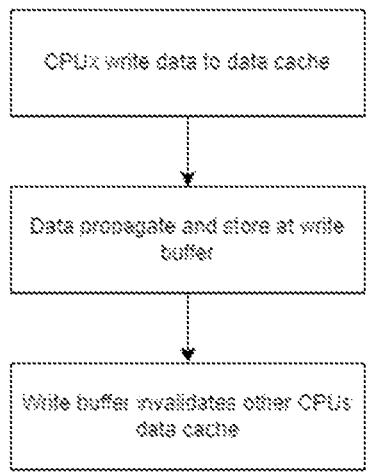
FIG. 3 is a flow chart of the method of the present invention.

The present invention is also a method for primary storage write traffic management, as illustrated in FIG. 3, comprising the following steps. In step (i), data is written to at least one level-1 data cache 105 by its corresponding processor 103. In step (ii), propagated said data is stored in at least one write buffer storage 205. In step (iii), other processor's level-1 data cache 105 is invalidated.

For example, one of the processors/CPUs, referred to as CPUx, write some data to the data cache, specifically to a portion of memory in said data cache, wherein said portion of memory is at times called cache line. This data will propagate to the write buffer storage 205 and store in one of the blocks of memory named buffer line. The size of the buffer line may be the same as the size of the cache line. After the data is stored, the write buffer invalidates the other CPUs' cache to inform them there is a change in the write buffer.

Figure 4:
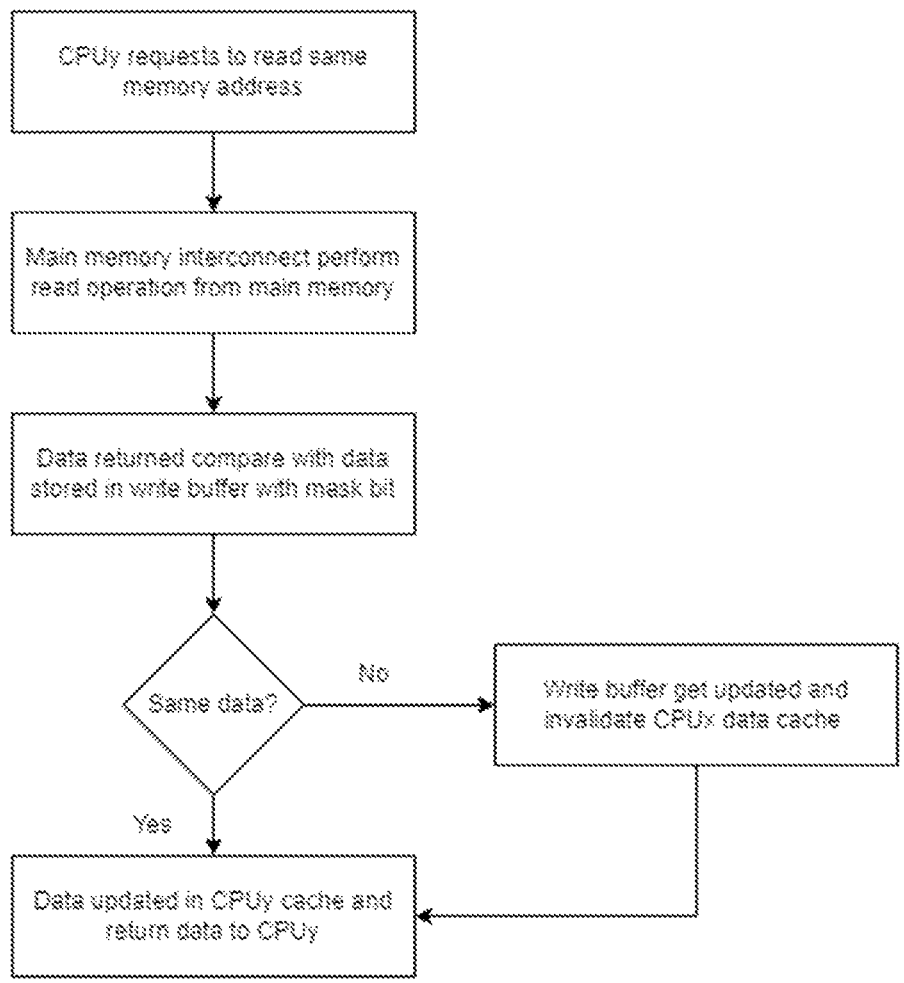
FIG. 4 is a flow chart of the method of the present invention, in a scenario whereby other CPUs read the same memory block which the current CPU was written.

In another scenario, as illustrated in FIG. 4, a second processor/CPU 103B reads data from a portion of memory called memory block in said write buffer storage 205 wherein said portion of memory was written by a first processor 103A previously, wherein the following steps happen after step (ii) and before step (iii) of the method of the present invention. Firstly, an external memory interface 109 performs read operation on the primary data storage 113 once a read request by said second processor 103B is accepted by said external memory interface 109. Then, said external memory interface 109 compares data obtained from said primary data storage 113 to data stored previously in said write buffer storage 205, with at least one mask. Thereafter, said external memory interface 109 sends said data obtained from said primary data storage 113 to update said second processor's data cache and further sending said data to said second processor 103B for processing, if said data obtained from said primary data storage 113 is the same as the data stored previously in said write buffer storage 205. If said data obtained from said primary data storage 113 is different as the data stored previously in said write buffer storage 205, said external memory interface 109 updates said write buffer storage 205 with said data obtained from said primary data storage 113 and invalidating data in said first processor's 103A data cache, before sending said data back to said second processor 103B.

In another scenario, a second processor/CPU 103B writes data to a portion of memory in said write buffer storage 205 wherein said portion of memory was written by a first processor 103A previously, comprising of the following steps after step (ii) and before step (iii). Firstly, said write buffer storage 205 is updated with said second processor's 103B data. Then, data in said first processor's 103A data cache is invalidated.

Figure 5:
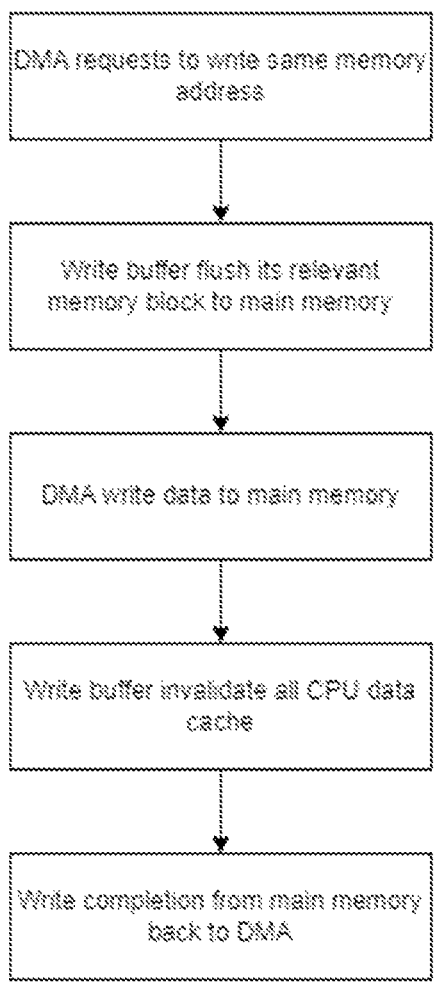
FIG. 5 is a flow chart of the method of the present invention, in a scenario whereby the DMA channel writes to the same memory block which the current CPU was written.

In another scenario, as illustrated in FIG. 5, if direct memory access (DMA) channel 111 writes data to a portion of memory in said write buffer storage 205 wherein said portion of memory was written by a first processor 103A previously, comprising of the following steps after step (ii) and before step (iii): A write buffer unit 110 which comprising of said write buffer storage 205 flushes said data in said portion of memory in said write buffer storage 205 to a primary data storage 113, which means said write buffer unit 110 will release the data that was originally stored in write buffer storage 205 and then write to the primary data storage 113. The DMA 111 performs write operation to said primary data storage 113. After said write operation is completed, said write buffer unit 110 holds the write completion signal back to said DMA 111 until said write buffer unit 110 invalidates all other processor's 103 data cache 105 to make sure the CPUs will always need to read from the main memory to get updated data. After all these steps are completed, the write buffer unit 110 sends write completion signal to said DMA 111.

Figure 6:
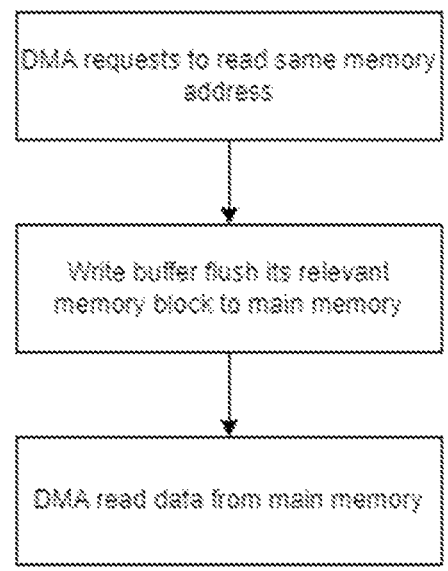
FIG. 6 is a flow chart of the method of the present invention, in a scenario whereby the DMA channel reads from the same memory block which the current CPU was written.

In another scenario, as illustrated in FIG. 6, if direct memory access (DMA) 111 reads data to a portion of memory in said write buffer storage 205 wherein said portion of memory was written by a first processor 103A previously, comprising of the following steps after step (ii) and before step (iii). The primary data storage 113 does not have data on the requested address as the data stays at the write buffer storage 205. A write buffer unit 110 flushes data from said portion of memory in said write buffer storage 205 to a primary data storage 113 before by said DMA 111 reads data from said portion of memory in said write buffer storage 205.

In another scenario, if direct memory access (DMA) 111 reads data to a portion of memory in said write buffer storage 205 wherein said portion of memory is different from the portion of memory wherein data was written by a first processor 103A previously, comprising of the following steps after step (ii) and before step (iii): In other words, the DMA channel 111 reads from or writes on a non-conflicting address. In this scenario, since the processors 103 did not modify the data on the portion of memory that said DMA 111 requested, said DMA 111 can perform writing or reading operation as usual without being blocked by said write buffer unit 110.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

What is claimed is:

1. A method for primary storage write traffic management, comprising:
   (i) writing data to at least one level-1 data cache by its corresponding processor;
   (ii) storing propagated said data in at least one write buffer storage by a write buffer unit; and
   (iii) invalidating other processor's level-1 data cache,
   and further comprising, when a second processor reads data from a portion of memory in said write buffer storage wherein said portion of memory was written by a first processor previously, the following are performed after (ii) and before (iii):
   performing read operation on a primary data storage by an external memory interface once a read request by said second processor is accepted by said external memory interface;
   comparing data obtained from said primary data storage by said external memory interface to data stored previously in said write buffer storage, with at least one mask;
   sending said data obtained from said primary data storage by said external memory interface to update said second processor's data cache and further sending said data to said second processor for processing, if said data obtained from said primary data storage is the same as the data stored previously in said write buffer storage; and
   updating said write buffer storage with said data obtained from said primary data storage by said external memory interface and invalidating data in said first processor's data cache, if said data obtained from said primary data storage is different from the data stored previously in said write buffer storage, before sending said data back to said second processor.

2. The method as claimed in claim 1, wherein if the second processor writes data to a portion of memory in said write buffer storage wherein said portion of memory was written by the first processor previously, the method further comprises, after (ii) and before (iii):
   updating said write buffer storage with said second processor's data; and
   invalidating data in said first processor's data cache.

3. A method for primary storage write traffic management, comprising:

(i) writing data to at least one level-1 data cache by its corresponding processor;
(ii) storing propagated said data in at least one write buffer storage by a write buffer unit; and
(iii) invalidating other processor's level-1 data cache,
and further comprising, when a direct memory access (DMA) writes data to a portion of memory in said write buffer storage wherein said portion of memory was written by a first processor previously, the following are performed after (ii) and before (iii):
flushing said data in said portion of memory in said write buffer storage to a primary data storage by said write buffer unit;
performing write operation to said primary data storage by said DMA;
holding a write completion signal back to said DMA by said write buffer unit after said write operation is completed until said write buffer unit invalidates all other processor's data cache; and
sending the write completion signal to said DMA by said write buffer unit (110).

4. A method for primary storage write traffic management, comprising:

(i) writing data to at least one level-1 data cache by its corresponding processor;
(ii) storing propagated said data in at least one write buffer storage by a write buffer unit; and
(iii) invalidating other processor's level-1 data cache,
and further comprising when a direct memory access (DMA) reads the data to a portion of memory in said write buffer storage wherein said portion of memory was written by a first processor previously, the following are performed after (ii) and before (iii):
flushing the data from said portion of memory in said write buffer storage by said write buffer unit to a primary data storage; and
reading the data from said portion of memory in said write buffer storage by said DMA.

5. The method as claimed in claim 4, wherein if said direct memory access reads the data to a portion of memory in said write buffer storage wherein said portion of memory is different from the portion of memory wherein the data was written by the first processor previously, the method further comprises, after (ii) and before (iii):
performing writing or reading operation by said DMA as usual without being blocked by said write buffer unit.

* * * * *